July 10, 1934.   G. F. MICHAEL   1,966,129
BRAKE
Filed Jan. 8, 1931

INVENTOR.
GUS. F. MICHAEL
BY
ATTORNEYS.

Patented July 10, 1934

1,966,129

UNITED STATES PATENT OFFICE 1,966,129

BRAKE

Gus F. Michael, South Bend, Ind., assignor to Bendix Brake Company, South Bend, Ind., a corporation of Illinois Application January 8, 1931, Serial No. 507,315

9 Claims. (Cl. 188—78)

This invention relates to brakes and more particularly to internal expanding brakes.

An object of the invention is to provide a brake generally known in the art as a single wrapping brake. This type of brake is very effective for one way braking. This is particularly so in the present invention since the structure provides for a servo action when the drum is rotating counterclockwise.

An important feature of the invention is a bracket having a recess or cutaway portion adaptable for the reception of an operating cam. The bracket provides an adequate abutment or anchor for one end of the friction element, the other end of which engages the operating cam.

Another important feature of the invention is pivotal wear plates on the anchoring and power applying ends of the friction element.

Still a further important feature of the invention is a fixed support on the backing plate having means thereon for retaining the friction elements against lateral movement and yet permitting free circumferential or radial movements for engagement with the braking surface of the drum.

Other features of the invention include steady rests comprising a single stamping secured to the backing plate and adaptable to support the friction element against lateral movement in either direction.

Other objects and features of the invention will appear from the following description taken in connection with the drawing, which forms a part of this specification, and in which.

Figure 1:
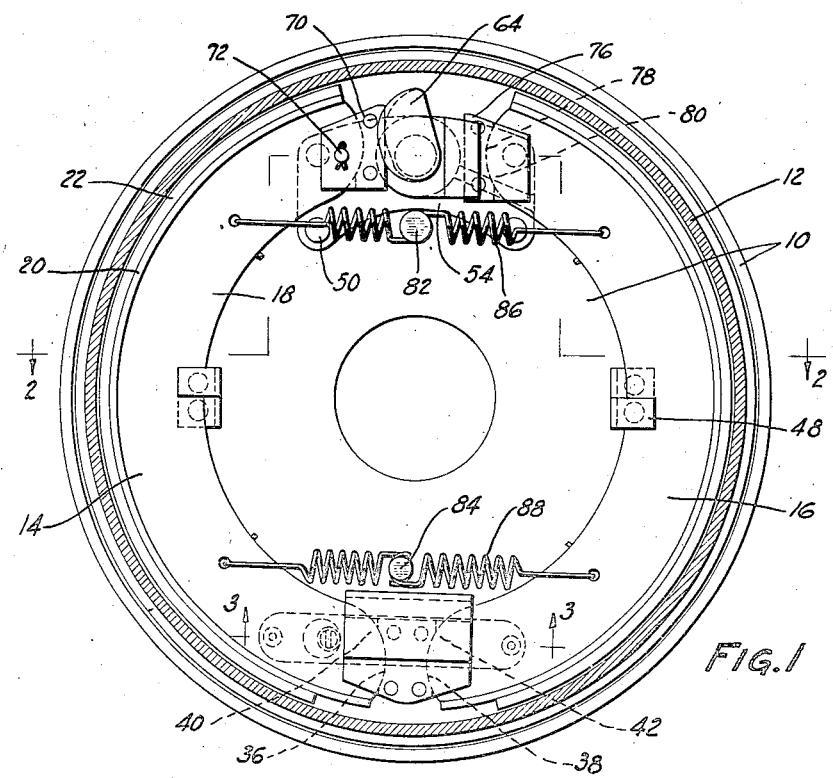
Figure 1 is a vertical sectional view taken just back of the head of the drum illustrating the invention as applied.
Figure 2:
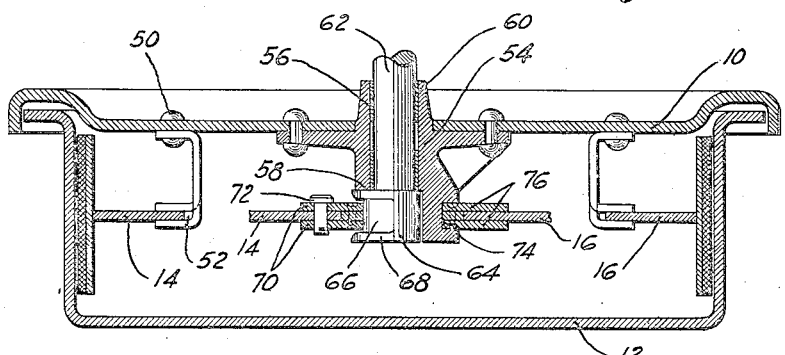
Figure 2 is a sectional view substantially on line 2—2, Figure 1.
Figures 3, 4:
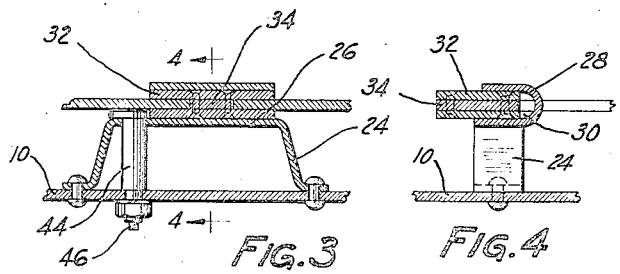
Figure 3 is a section substantially on line 3—3, Figure 1.
Figure 4 is a section substantially on line 4—4, Figure 3.

Referring to the drawing for more specific details of the invention, 10 represents a fixed support such as a backing plate. The backing plate has associated therewith a rotatable drum 12. Positioned for movement on the backing plate is a primary shoe 14 and a secondary shoe 16. As shown, each shoe comprises a web 18 supporting a rim 20 having suitably secured thereto a lining 22 adaptable for cooperation with the braking surface of the drum.

Supported on the backing plate is a bracket 24, a portion 26 of which is parallel to the backing plate 10. This portion is bent upon itself as indicated at 28 to provide a channel 30 in which is slidably positioned a block 32 comprising two corresponding plates between which is positioned a thrust block 34 having oppositely disposed recesses 36 and 38 adaptable for the reception of rounded shoulders 40 and 42 on the articulated ends of the primary and secondary shoes 14 and 16. Positioned on the bracket 24 is an eccentric 44 adjustable from outside the structure as indicated at 46. The eccentric is adapted for adjusting the shoes to the radius of the drum.

The shoes are further supported on the backing plate by steady rests 48. Each of the steady rests comprises a single stamping having one end riveted or otherwise secured on the backing plate as indicated at 50 and its other end bifurcated as at 52 to receive the web of the friction element.

Positioned on the backing plate between the anchored end of the shoes and the power applying end of the shoes is a bracket 54 having a central bore 56 and a cutaway portion 58. Positioned in the bore is a suitable bushing 60 and positioned for rotation in the bushing is an operating shaft 62. This shaft has formed or secured thereon a cam 64 positioned in the cutaway portion 58, the cam 64 having a lobe 66 provided with flanges 68 adapted to straddle a wear plate 70 pivoted as indicated at 72 on the power applying end of the shoes.

The bracket 54 has a slot 74 positioned in the longitudinal plane of the operating cam 64. This slot receives a wear plate 76 which has a slip joint connection with the web of the secondary shoe 16 and a notch 78 conforming to the rounded shoulder 80 on the anchoring end of the secondary shoe, so that this element may be free to move radially and circumferentially for engagement with the braking surface of the drum.

Positioned substantially in the diameter of the backing plate are fixed supports 82 and 84 connected respectively by springs 86 and 88 to the primary and secondary shoes. These springs serve to return the shoes to the off position and to retain them when in the off position in proper relation to the braking surface of the drum.

While preferred embodiments of the invention have been described, it is to be understood that these are given merely as examples of the underlying principles of the invention and since these may be incorporated in other specific mechanical structures, I do not intend to be limited to those shown, except as such limitations are clearly imposed by the appended claims.

Having thus described the various features of the invention, what I claim as new and desire to secure by Letters Patent is:

1. A brake comprising a bracket having a cutaway portion and having a slot opposite the cutaway portion, an operating shaft positioned for rotation in the bracket, a cam on the shaft positioned in the cutaway portion, and friction means engaged by said cam at one end and anchoring against the bracket and movably seated in said slot at the other end.

2. A brake comprising a bracket having a cutaway portion and a slot arranged in oppositely disposed relation to the cutaway portion, a shaft positioned for rotation in the bracket and a cam on the shaft in the cutaway portion having a lobe arranged in the same plane with the slot in the bracket.

3. A brake comprising a friction element having wear plates secured together beyond the end of said element and having parts embracing the end of said element between them and pivoted thereto.

4. A brake comprising a friction element having an anchored end and a power applying end each provided with a rounded shoulder, a wear plate having a slip joint connection to the web of the friction element and having a portion adapted to co-operate with the rounded shoulder on the anchored end of the friction element and a wear plate pivotally connected to the power applying end of the friction element.

5. A brake comprising a friction element, a wear plate having corresponding plates embracing the end of the web of the friction element between them, a thrust plate positioned intermediate the corresponding plates and means for pivotally mounting the corresponding plates on the web of the friction element.

6. A brake comprising a connection for the articulated ends of a friction element including corresponding plates and a thrust plate secured between the corresponding plates.

7. A brake comprising a connection for the friction elements of a brake including corresponding plates and a thrust plate intermediate the corresponding plates having oppositely disposed notches adaptable for the reception of the articulated ends of the friction element.

8. A brake comprising a bracket having a portion bent to form a channel and a member positioned for movement in the channel having oppositely disposed parts adaptable for the reception of the articulated ends of a friction element.

9. A brake comprising a bracket having a portion bent upon itself to provide a slot and a member slidable in the slot having oppositely disposed notches adaptable for the reception of the articulated ends of the friction element.

GUS F. MICHAEL.